(12) United States Patent
Halbesma

(10) Patent No.: US 6,554,121 B1
(45) Date of Patent: Apr. 29, 2003

(54) METHOD AND APPARATUS FOR CONVEYING RELATIVELY VOLUMINOUS PACKING UNITS, SUCH AS CONTAINERS

(75) Inventor: Joan Anton Bernard Halbesma, Zilverberg 3, Zoetermeer (NL), 2716

(73) Assignee: Joan Anton Bernard Halbesma, Zoetermeer (NL)

( * ) Notice: Subject to any disclaimer, the term of this patent is extended or adjusted under 35 U.S.C. 154(b) by 0 days.

(21) Appl. No.: 09/242,073
(22) PCT Filed: Aug. 7, 1997
(86) PCT No.: PCT/NL97/00459
§ 371 (c)(1), (2), (4) Date: Sep. 15, 1999
(87) PCT Pub. No.: WO98/06650
PCT Pub. Date: Feb. 19, 1998

(30) Foreign Application Priority Data

Aug. 8, 1996 (NL) .............................................. 1003764

(51) Int. Cl.[7] .............................................. B65G 63/00
(52) U.S. Cl. .................. 198/349; 198/349.5; 414/139.4
(58) Field of Search .............................. 198/349, 349.5, 198/349.6, 349.9; 414/139.4

(56) References Cited

U.S. PATENT DOCUMENTS

| | | | | |
|---|---|---|---|---|
| 3,543,952 A | * | 12/1970 | Young et al. ............ | 414/140.3 |
| 3,743,090 A | * | 7/1973 | Brown et al. ............ | 198/349.9 |
| 3,799,365 A | * | 3/1974 | Sullivan et al. .......... | 198/349.9 |
| 3,880,298 A | * | 4/1975 | Habegger et al. ............ | 198/349 |
| 5,080,019 A | * | 1/1992 | Takemura et al. ........ | 198/349.6 |
| 5,842,555 A | * | 12/1998 | Gannon et al. .......... | 198/349.9 |
| 5,882,164 A | * | 3/1999 | Rapeli et al. ............. | 414/139.4 |

FOREIGN PATENT DOCUMENTS

| | | |
|---|---|---|
| NL | 7 108 114 A | 12/1971 |
| NL | 7 600 309 A | 7/1977 |
| WO | WO 96 09242 A | 3/1996 |

* cited by examiner

Primary Examiner—Christopher P. Ellis
Assistant Examiner—Mark A. Deuble
(74) Attorney, Agent, or Firm—Chadbourne & Parke, LLP

(57) ABSTRACT

Method and apparatus (6) for conveying relatively voluminous packing units (4), such as containers, particularly containers in shipping ports, from a put-on location (10, 11) to a takeoff location (19), via conveying means (7, 8, 9) that are separately drivable and fixedly disposed and can displace a packing unit independently of further packing units. By a first conveying means, a displacement is imposed on a packing unit in a direction towards a connecting second conveying means, and the packing unit is thus transferred to the second conveying means, which maintains or changes the direction of the displacement during the transfer of the packing unit to a connecting third conveying means, depending on the pattern (10–18) in which the interconnecting conveying means that are present are arranged and the desired track over those conveying means between the put-on location and the takeoff location.

2 Claims, 1 Drawing Sheet

Figure 1:
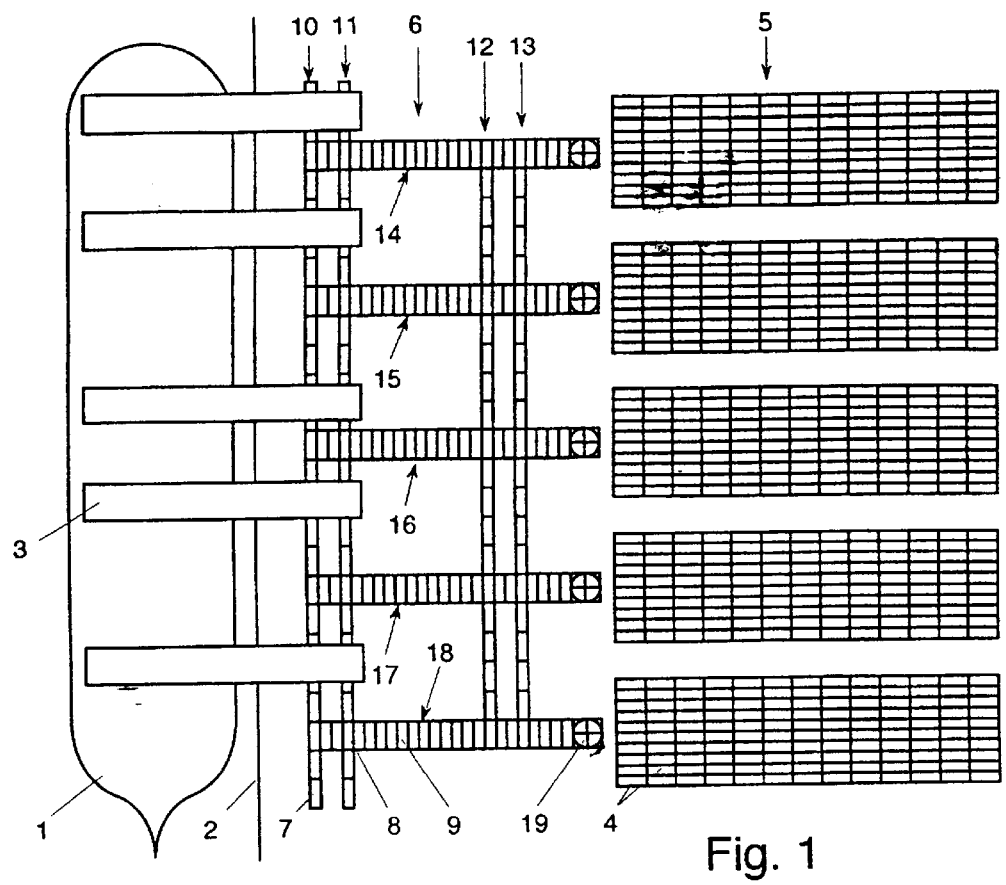

METHOD AND APPARATUS FOR CONVEYING RELATIVELY VOLUMINOUS PACKING UNITS, SUCH AS CONTAINERS

The invention relates to a method for conveying relatively voluminous packing units, such as containers, more in particular containers in shipping ports, wherein each packing unit can be separately displaced by a conveying means and the packing unit is conveyed, independently of further packing units, from a put-on location to a take-off location, and an apparatus for carrying out such method, as known from NL-A-760030g and NL-A-7108444.

In the dock industry, such method is known for the automized conveyance of containers, wherein up to the present, centrally controlled individually operating robot vehicles, better known as Automatic Guided Vehicles (AGVs) have been employed because of the individual collecting and delivery addresses that are specific for each container.

It has been found that a conveying system having AGVs can only provide a limited maximum conveying capacity at a relatively small number of AGVs deployed. When more AGVs are deployed, the effective capacity rapidly decreases because of the delay caused by AGVs disturbing one another in their movements when travelling back and forth loaded or unloaded. This problem could be solved through the use of conveying tracks as known in production and distribution environments, inter alia for, providing a continuous conveyance of goods from one location to the other. Although such conveying tracks are extremely suitable for mass transport, the conveyed goods cannot follow individual routes.

The object of the invention is to improve the method described in the opening paragraph in such a manner that the conveying capacity is extended considerably, while the possibility of having the goods follow individual routes is maintained.

According to the invention, this object is realized in that by a first conveying means, which carries a packing unit and which is fixedly disposed, a displacement is imposed on that packing unit in a direction towards a connecting, fixedly disposed second conveying means, and the packing unit is thus transferred to the second conveying means, which maintains or changes the direction of the displacement during the transfer of the packing unit to a connecting, fixedly disposed third conveying means, depending on a pattern in which the interconnecting conveying means that are present are arranged and a desired path over those conveying means between the put-on location and the take-off location. Because of these features, a system of branched conveying paths can be obtained wherein it becomes possible, by virtue of the segmented construction of the system by means of the various stationary, interconnecting conveying means, drivable in a mutually independent manner, to have each packing unit follow its own individual path, while the advantage of a mass transport is entirely maintained.

A path to be followed by a packing unit can be established in advance, depending on the put-on and take-off locations. To enable processing a large number of packing units simultaneously and in a flexible and efficient manner, it is preferred that the path to be followed by each packing unit over the conveying means be determined by a central control which, depending on the intended take-off location and the place where the packing unit is currently located, successively activates the desired conveying means. The determination of the current location of a particular packing unit can readily be performed through the provision of an identification means on the packing unit and a fixedly disposed detecting mechanism connected to the central control, which detecting mechanism is preferably provided on each conveying means. To prevent thrusts by means of intermediate storage, it may further be provided that the activation of successively connecting conveying means for transferring a packing unit from one conveying means to the other is performed with time delay.

The invention also relates to an apparatus for carrying out a conveyance as discussed hereinabove. To that end, an apparatus comprising a number of separately drivable conveying means, each capable of carrying and displacing a packing unit to be conveyed, is constructed according to the invention in such a manner that the conveying means each comprise an independently drivable conveying track and are arranged so as to be stationary in at least two rows which intersect while enclosing an angle relative to each other, wherein a packing unit can be transferred, by a conveying means associated with one of the rows, to an adjacent conveying means associated with the same row, and of each row at least one of the conveying means associated with that row can transfer the packing unit to a conveying means associated with another row. Thus, the possibility of an optimum manoeuvrability can be created for handling a flow of packing units in a flexible and efficient fashion, while it is preferred that a number of transverse rows of conveying means connect perpendicularly to a first row of conveying means, and further that the transverse rows of conveying means be connected by at least one further row of conveying means, which row is disposed parallel to and spaced from the first-mentioned row of conveying means. In this manner, a network of conveying paths can be created, whereby the separate packing units can each be delivered at the desired location and the desired point of time. In order that the above proceeds as smoothly and effectively as possible, it is preferred that a detecting mechanism be provided for observing an identification means connected to each packing unit, which detecting mechanism is connected to a central control which can activate each conveying means individually for displacing the packing unit in the desired direction. The detecting mechanism can for instance be radiographically provided with information by the identification means of the various packing units. However, it is preferred that each conveying means be provided with a detecting mechanism connected to the central control.

Figure 2:
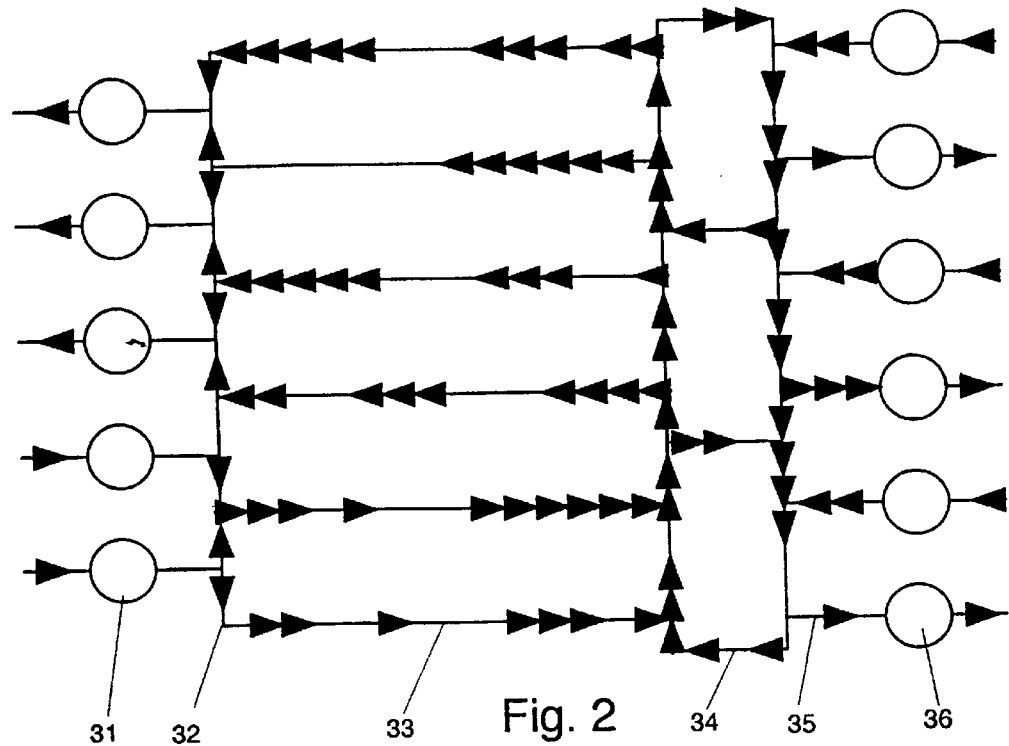

Referring to an exemplary embodiment shown in the drawing, the method and apparatus according to the invention will now be specified, by way of example only. In this drawing:

FIG. 1 schematically shows, in top plan view, a conveying apparatus according to the invention, disposed between a ship and a container-storage location; and FIG. 2 is a schematic representation of a possible conveying diagram.

FIG. 1 shows a container ship 1 which is moored to a quay 2 and can be loaded and unloaded by means of conventional, mobile cranes 3 disposed on the quay 2. Containers 4 unloaded and to be loaded are located at a storage location 5, while the containers 4 can be picked up and put down by means of conventional cranes, not shown. Disposed between the cranes 3 and the storage location 5 is a conveying apparatus 6 according to the invention.

The conveying apparatus 6 is composed of a large number of separately drivable conveying tracks 7, 8 and 9. The conveying tracks 7 and 8 are arranged in four rows 10–13 parallel to the ship 1 moored along the quay 2 and have a conveying direction in the longitudinal direction of the rows 10–13. The rows 10 and 11 are positioned so that the cranes 3 can place thereon containers coming from the ship 1 or pick up therefrom containers to be placed in the ship 1. The rows 10–13 are interconnected by five transverse rows 14–18, composed of conveying tracks 8 and 9. The conveying tracks 8 forming part of both the rows 10–13 and the rows 14–18 transverse thereto can be driven so that a container located thereon can be transferred to an adjacent conveying track 7 as well as 9. The transverse rows 14–18 terminate near the storage location 5 in an element 19, that can be covered by the above-mentioned cranes, not shown, operating the storage locations.

Each of the conveying tracks 7–9 is dimensioned so that it is capable of receiving and carrying the largest possible container occurring. Further, each conveying track 7–9 comprises the detecting mechanisms 21–23, which may either be mounted on the conveying tracks 7–9 or be stationed in the vicinity of those tracks, capable of recognizing, on the basis of an identification means provided on each container, a specific container and passing on that information to a central control 25, which, in turn, is capable of activating a specific conveying track 7–9 independently of the other conveying tracks, and also, in the case of a conveying track 8, of determining the driving direction in the direction of the rows 10–13 or the rows 14–18. The construction and arrangement of the detecting mechanism 21 and the central control are generally known to one skilled in the art, and may consist of any proximity detector or detecting switch: either optical, ultrasonic, electro magnetic, piezo or may use any other comparable commonly known and utilized techniques. The detectors 21–23 are preferably connected or communicate via wireless transmissions to the central control 25, which may be a local CPU (i.e. a computer) or a PLC (i.e., a Programmable Logic Controle), as shown in the amended FIG. 1, which controls the local logical functions of the detectors and controls the conveying tracks via wireless signals, as for example using particular radio frequencies to control operation of the conveying tracks. It is also understood that the central control 25 may consist of multiple PLCs and/or CPUs, interconnected into a LAN (local area network). The control software for the operation of the central control 25 may reside either locally in each PLC's and/or CPU, in the central CPU on the network, or be distributed over a network of PLCs and/or CPUs.

The operation of the conveying apparatus is as follows:

If a container is to be unloaded from the ship, it is taken from the hold of the ship 1 by a crane 3. The container with its contents was located at a known place in the hold and is to be put down on a predetermined spot at the storage location 5. To enable this to be effected, the container is provided, before or during unloading, with an identification means, which is observed by the detecting mechanism of the relevant conveying track 7 or 8 when the container is being put down on the row 10 or 11, which information is passed on to the central control, which has been provided with the information where the relevant container is to be put down at the storage location. Depending on the locations of containers on the various rows, the central control defines a conveying route over the various conveying tracks such that the container is conveyed to the predetermined spot at the storage location 5 in a maximally efficient manner by successively activating the conveying tracks which displace the container along the desired route.

It will be understood that moving a container from a particular spot of the storage location 5 to a particular spot in the hold of the ship 1 can be performed in a similar manner.

It is also possible to have the conveying apparatus 6 simultaneously displace containers from and to the ship 1. This is schematically shown in FIG. 2, albeit for a conveying apparatus of a different lay-out. Arranged adjacent the quay are five cranes 31 which can deposit a container taken from the hold of a ship not shown, onto a row 32 having a similar construction as a row 10 in FIG. 1. From the row 32, the containers can be passed on to one of the rows 33, having the same construction as the rows 14–18 according to FIG. 1, albeit that the rows 33 terminate at a transverse row forming part of a multiple circuit 34, composed from conveying tracks such as those designated by reference numerals 7–9 in FIG. 1. Connecting to the circuit 34, in line with the rows 33, are similar rows 35, terminating at elements 36 that correspond to the elements 19 in FIG. 1. Arrows indicate how the various flows of containers from and to the cranes 31 may run. In this connection, the circuit 34 can be used as distribution member, while the rows 33 can serve as buffer storage or collecting storage. Of course, this is again controlled by a central control on the basis of information obtained from the detecting mechanisms connected to each of the conveying tracks and the identification means provided on each container.

It is readily understood that within the framework of the invention as laid down in the appended claims, still many modifications and variants are possible. This of course concerns the lay-out of the conveying apparatus, which may have any other suitable design, while, through a suitable design of the conveying tracks, interconnecting the rows at an angle other than the right angle shown may also be thought of. It is also possible to provide not every conveying track with a detecting mechanism, but to provide each container for instance with a radiographic beacon whereby the exact location of that container within the conveying apparatus can be determined. It is also possible to design the storage location 5 so that the transverse rows can be extended as far as and beyond the storage location. The containers can then be directly fed in a quick and simple manner to conveying means such as trains, trucks and inland ships, providing further transportation to the eventual destination.

What is claimed is:

1. A method for displacing at least one container using a conveyor system from a put-on location to a put-off location, independently of previous or following containers at said put-on location, comprising the steps of:

unloading said container at said put-on location;

placing said container onto a first set of conveyor tracks at said put-on location, wherein said conveyor tracks at said put-on location are designed to support and transport a plurality of containers following each other one at a time;

transferring said container along set tracks in a first direction onto a second set of conveyor tracks, interconnected with said first set of conveyor tracks and designed to support and transport a plurality of containers following each other one at a time, wherein said second set of conveyor tracks is capable of displacing said container in a plurality of different directions, independently of the previous or following containers, at least one of said directions situated at an angle to said first direction;

determining which of said plurality of directions is to be chosen for a transfer of said container from said second set of conveyor tracks;

displacing said container from said second set of conveyor tracks onto a third set of conveyor tracks being designed to support and transport a plurality of containers following each other one at a time in a second direction that is at an angle to said first direction, if it is determined that said container is to be transferred in a direction that is at an angle to said first direction;

alternatively, displacing said container from said second set of conveyor tracks onto a fourth set of conveyor tracks, being designed to support and transport a plurality of containers following each other one at a time and maintaining said first direction, if it is determined that said container is not to be transferred in a direction that is at an angle to said first direction; and transferring said container to an intended take-off location.

2. A conveyor system for conveying at least one container from a put-on location to a different intended take-off location, independently of the previous or following containers at said put-on location, comprising:

a plurality of separately drivable conveying tracks, each said conveying track capable of both supporting and transporting said container in at least one direction, a first subset of said plurality of conveying tracks being arranged and interconnected to form at least one conveying row for transferring said container in a first direction, a second subset of said plurality of conveying tracks connected at an angle in relation to said first direction to at least one conveying track of said first subset of conveying tracks, said connection allowing transfer of said container from said conveying row formed by said first subset of conveying tracks to a second set of conveying tracks at an angle to said first direction, independently of the previous or following containers transferred along said first subset of conveying tracks.

* * * * *